(12) United States Patent
Moore et al.

(10) Patent No.: US 10,888,894 B2
(45) Date of Patent: Jan. 12, 2021

(54) METHOD OF APPLYING COATING LIQUID TO AN OPTICAL FIBER

(71) Applicant: Corning Incorporated, Corning, NY (US)

(72) Inventors: Robert Clark Moore, Wilmington, NC (US); Douglas Gregg Neilson, Wilmington, NC (US); Johnnie Edward Watson, Hampstead, NC (US)

(73) Assignee: Corning Incorporated, Corning, NY (US)

( * ) Notice: Subject to any disclaimer, the term of this patent is extended or adjusted under 35 U.S.C. 154(b) by 10 days.

(21) Appl. No.: 15/950,243

(22) Filed: Apr. 11, 2018

(65) Prior Publication Data

US 2018/0304304 A1 Oct. 25, 2018

Related U.S. Application Data

(60) Provisional application No. 62/489,123, filed on Apr. 24, 2017.

(30) Foreign Application Priority Data

Jun. 20, 2017 (NL) ..................................... 2019098

(51) Int. Cl.
*B05D 1/18* (2006.01)
*B05D 3/06* (2006.01)
(Continued)

(52) U.S. Cl.
CPC .................. *B05D 1/18* (2013.01); *B05C 3/12* (2013.01); *B05C 3/172* (2013.01); *B05C 11/10* (2013.01);
(Continued)

(58) Field of Classification Search
CPC .... B05D 1/18; B05D 3/06; B05D 7/20; B05C 3/172; B05C 3/12; B05C 11/10;
(Continued)

(56) References Cited

U.S. PATENT DOCUMENTS 4,201,151 A * 5/1980 Maklad ................. C03C 25/106
118/405
4,704,307 A 11/1987 Jochem et al.
(Continued)

FOREIGN PATENT DOCUMENTS

KR 345322 B1 7/2002

OTHER PUBLICATIONS

Bird et al; "Transport Phenomena", 2nd Ed. pp. 53-56 (Annular Flow) & 65 (Wire Coating Flow). New York: Wiley and Sons (2002).
(Continued)

*Primary Examiner* — Michael P Wieczorek
*Assistant Examiner* — Michael G Miller
(74) *Attorney, Agent, or Firm* — Kevin L. Bray

(57) ABSTRACT

A method of applying a coating liquid to an optical fiber is described. An optical fiber is drawn through a guide die into a pressurized coating chamber and through the pressurized coating chamber to a sizing die. The pressurized coating chamber contains a coating liquid. The method includes directing coating liquid in a direction transverse to the processing pathway of the optical fiber in the pressurized coating chamber. The transverse flow of coating liquid counteracts detrimental effects associated with gyres that form in the pressurized coating chamber during the draw process. Benefits of the transverse flow include removal of bubbles, reduction in the temperature of the gyre, improved
(Continued)

wetting, homogenization of the properties of the coating liquid in the pressurized coating chamber, and stabilization of the meniscus.

20 Claims, 9 Drawing Sheets

(51) Int. Cl.
G02B 6/02 (2006.01)
B05C 11/10 (2006.01)
B05C 3/12 (2006.01)
C03C 25/106 (2018.01)
C03C 25/1065 (2018.01)
C03C 25/18 (2006.01)
C03C 25/12 (2006.01)
B05C 3/172 (2006.01)
B05C 3/00 (2006.01)
B05D 7/20 (2006.01)

(52) U.S. Cl.
CPC ............. *B05D 3/06* (2013.01); *C03C 25/106* (2013.01); *C03C 25/1065* (2013.01); *C03C 25/12* (2013.01); *C03C 25/18* (2013.01); *G02B 6/02395* (2013.01); B05C 3/005 (2013.01); B05D 7/20 (2013.01)

(58) Field of Classification Search
CPC ......... B05C 3/005; C03C 25/12; C03C 25/18; C03C 25/1065; C03C 25/106; G02B 6/02395
USPC .................................................. 427/162–169
See application file for complete search history.

(56) References Cited

U.S. PATENT DOCUMENTS

| | | |
|---|---|---|
| 4,792,347 A | 12/1988 | Deneka et al. |
| 5,974,837 A | 11/1999 | Abbott, III et al. |
| 6,911,086 B2 * | 6/2005 | Saurel .................. C03C 25/104 118/125 |
| 9,932,260 B2 | 4/2018 | Billings et al. |
| 2002/0166345 A1 * | 11/2002 | Naka .................. C03C 25/1065 65/529 |
| 2003/0136340 A1 | 7/2003 | Fujimaki et al. |
| 2005/0028731 A1 * | 2/2005 | Lindholm ................. B05C 3/12 118/400 |
| 2012/0196122 A1 * | 8/2012 | Bishop .................. C03C 25/106 428/392 |
| 2015/0147467 A1 | 5/2015 | Moore et al. |
| 2016/0083293 A1 | 3/2016 | Okada |

OTHER PUBLICATIONS

Blyler et al; "Coatings and Jackets"; Optical Fiber Telecommunications Chapter 10; pp. 299-341 (1979).
Jacqmin; "Very, Very Fast Wetting"; J. Fluid Mech. (2002), vol. 455, pp. 347-358.
Kim "Analysis of Capillary Coating Die Flow in an Optical Fiber Coating Applicator;" World Academy of Science, Engineering, and Technology, Int. Jour. Mech., Aerospace, Industrial Mechatronic, and Manufacturing Engineering, 7, pp. 1302-1306 (2011).
Kistler; "Hydrodynamics of Wetting" Wettability (Ed. J. Berg), pp. 339-346. Marcel Dekker, 1993.
NL2019098 Search Report dated Dec. 6, 2017; 9 Pages; European Patent Office.
Panoliaskos et al; "Prediction of Optical Fiber Coating Thickness"; Applied Optics, vol. 24, No. 15, p. 2309-2312; Aug. 1, 1985.
Simpkins et al; "On Air Entrainment in Coatings"; Journal of Colloid and Interface Science, 263; p. 562-571 (2003).
De et al; "Optical Fiber Coating Die With Reduced Wetted Length"; Filed as U.S. Appl. No. 15/868,029, filed Jan. 11, 2018; 23 Pages.
English Translation of CN201880027290.5 Office Action dated June 24, 2020; 8 pages; Chinese Patent Office.

* cited by examiner

METHOD OF APPLYING COATING LIQUID TO AN OPTICAL FIBER

This application claims the benefit of priority to Dutch Patent Application No. 2019098, filed on Jun. 20, 2017, which claims the benefit of priority to U.S. Provisional Application Ser. No. 62/489,123 filed on Apr. 24, 2017, the content of which is relied upon and incorporated herein by reference in its entirety.

FIELD

This description relates to a method for coating an optical fiber. More particularly, this description relates to a method for applying a coating liquid to an optical fiber.

BACKGROUND

The transmittance of light through an optical fiber is highly dependent on the properties of the coatings applied to the fiber. The coatings typically include a primary coating and a secondary coating, where the secondary coating surrounds the primary coating and the primary coating contacts the glass waveguide (core+cladding) portion of the fiber. The secondary coating is a harder material (higher Young's modulus) than the primary coating and is designed to protect the glass waveguide from damage caused by abrasion or external forces that arise during processing and handling of the fiber. The primary coating is a softer material (low Young's modulus) and is designed to buffer or dissipate stresses that result from forces applied to the outer surface of the secondary coating. Dissipation of stresses within the primary layer attenuates the stress and minimizes the stress that reaches the glass waveguide. The primary coating is especially important in dissipating stresses that arise when the fiber is bent. The bending stresses transmitted to the glass waveguide on the fiber needs to be minimized because bending stresses create local perturbations in the refractive index profile of the glass waveguide. The local refractive index perturbations lead to intensity losses for the light transmitted through the waveguide. By dissipating stresses, the primary coating minimizes bend-induced intensity losses.

A coating liquid commonly used in the manufacture of optical fibers is an acrylate-based composition which is curable by exposure to heat or ultraviolet (UV) light. The coating liquid is applied to the surface of the fiber in a liquid state and is subsequently exposed to heat or UV light for curing. The coating liquid may be applied in one or more layers, with a two-layer coating system (primary+secondary) often being a preferred embodiment. The primary coating is applied directly to the surface of the fiber, and the secondary coating is applied over the primary coating.

In a typical optical fiber draw process, fiber is continuously drawn from a glass preform at a particular draw speed. The glass preform includes a central region having the core composition desired for the drawn fiber and one or more surrounding annular regions having the composition desired for one or more cladding regions of the drawn optical fiber. The preform is positioned in a draw furnace and heated sufficiently to soften the glass. The action of gravity and a pulling force driven by a capstan leads to extension of glass from the softened portion of the preform. As the glass extends, it thins and forms a fiber. The diameter of the fiber is controlled, the fiber is cooled, and is then directed to a coating unit for application of one or more coating liquids. The coating liquids are cured to form solid coatings and the coated fiber is taken up and wound on a spool. The route traversed by the fiber as it progresses from the draw furnace to the spool is referred to as the process pathway.

There is a continuing need to reduce the cost of optical fiber manufacturing by increasing the draw speed. As draw speed increases, however, it becomes more difficult to apply and cure the coating liquid. In particular, it becomes more difficult to achieve coatings with uniform thickness over the length and circumference of the fiber. Uniformity of coating thickness is needed to facilitate splicing and joining of coated fibers, and to attach connectors to the ends of coated fibers. There is currently a need for coating processes that permit formation of coatings of uniform thickness on glass fibers in continuous high speed draw processes.

SUMMARY

A method of applying a coating liquid to an optical fiber is described. An optical fiber is drawn through a guide die into a coating chamber and through the coating chamber to a sizing die. The coating chamber contains a coating liquid. The method includes directing coating liquid in a direction transverse to the processing pathway of the optical fiber in the coating chamber. The transverse flow of coating liquid counteracts detrimental effects associated with gyres that form in the coating chamber during the draw process. Benefits of the transverse flow include removal of bubbles, reduction in the temperature of the gyre, improved wetting, homogenization of the properties of the coating liquid in the coating chamber, and stabilization of the meniscus.

The present description extends to:
A method of processing an optical fiber, comprising the steps of:
drawing an optical fiber in a drawing direction along a process pathway through a coating chamber, the coating chamber containing a coating liquid to coat the optical fiber, and
directing a separate flow of the coating liquid through the coating chamber in a direction transverse to the drawing direction, the separate flow of the coating liquid sweeping across, through and/or around the process pathway in the drawing direction to mix with, dilute, or otherwise interact thermally or mechanically with the coating liquid contained in the coating chamber.

The present description extends to:
A method of processing an optical fiber, comprising the steps of:
drawing an optical fiber in a drawing direction along a process pathway through a coating chamber comprising coating liquid in order to coat the optical fiber, and
directing a separate flow or stream of coating liquid through the coating chamber in a direction transverse to the direction of the drawing direction of the optical fiber through the coating chamber, which transverse flow of coating liquid sweeps across, through and/or around the process pathway in the drawing direction to mix with, dilute, or otherwise interact thermally or mechanically with the coating liquid comprised in the coating chamber.

The present description extends to:
A system for processing an optical fiber comprising:
one or more coating chambers for holding coating liquid for coating an optical fiber, the coating chamber comprising a fiber entrance and a fiber exit,
an inlet for delivering a stream or flow of coating liquid into the coating chamber,
an outlet for removing coating liquid from the coating chamber, which inlet and outlet are distinct from the fiber entrance and fiber exit, which inlet is configured to deliver the flow or stream of coating liquid in a direction transverse to a drawing direction of the optical fiber through the coating chamber.

The present description extends to:

A method of processing an optical fiber comprising:

drawing an optical fiber through a guide die to a pressurized coating chamber at a draw speed, said pressurized coating chamber containing a first coating liquid;

forming a meniscus of said first coating liquid on said optical fiber in said pressurized coating chamber;

forming a boundary layer on said optical fiber in said pressurized coating chamber, said boundary layer comprising said first coating liquid and initiating at said meniscus, said boundary layer having a thickness that increases with increasing distance from said guide die;

drawing said optical fiber through said pressurized coating chamber at said draw speed to a sizing die, said sizing die inducing constriction of said boundary layer, said constriction causing expulsion of said first coating liquid from said boundary layer to said pressurized coating chamber and formation of a gyre in said pressurized coating chamber, said gyre comprising said first coating liquid;

drawing said optical fiber through said sizing die at said draw speed, said optical fiber exiting said sizing die with a surface layer of said first coating liquid; and flowing said first coating liquid in said coating chamber in a transverse direction through a channel positioned between said guide die and said sizing die.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
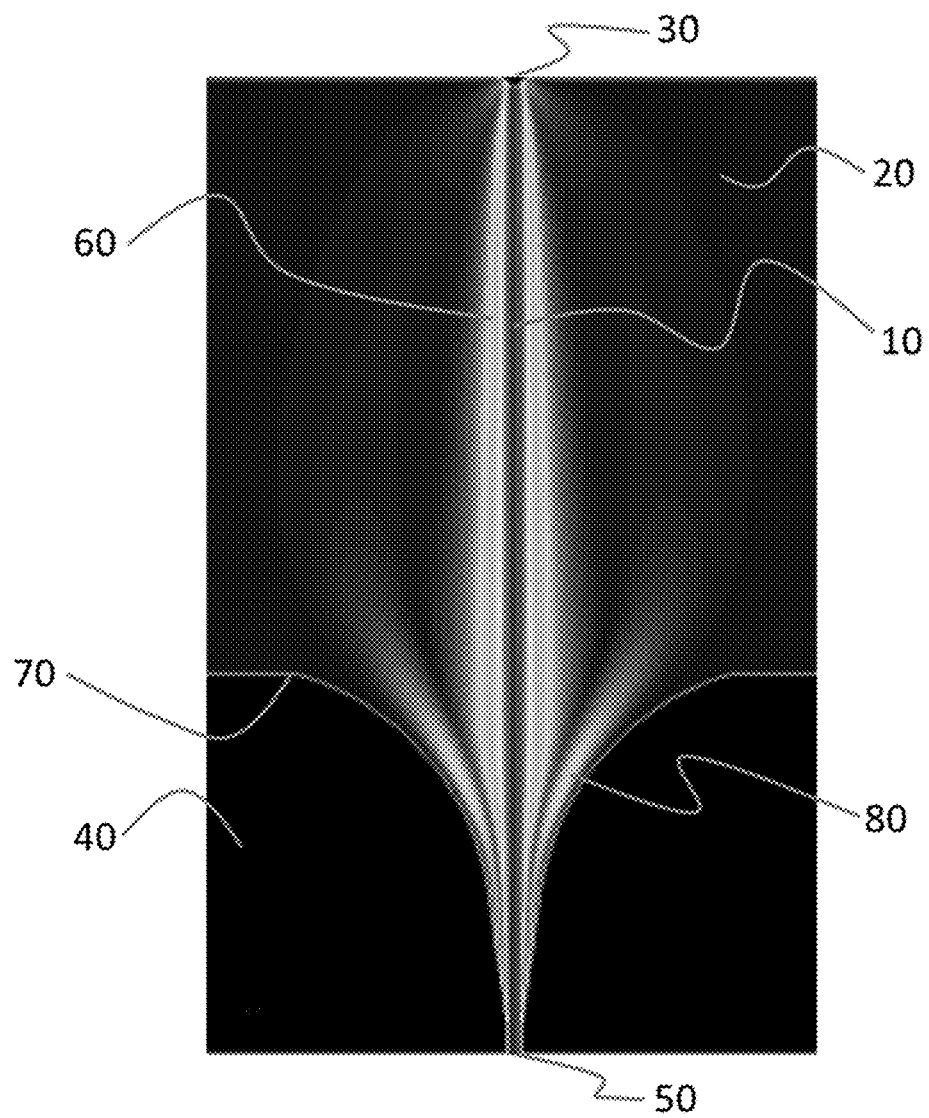
FIG. 1 shows a calculated boundary layer of coating liquid on an optical fiber.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

The present description refers to methods and processes for forming optical fibers. In a continuous optical fiber manufacturing process, an optical fiber is drawn from a heated preform positioned in a draw furnace and passed through a series of processing stages. Processing stages typically include metrology units (e.g. fiber diameter control) to assess quality and other characteristics of the optical fiber, heating stages, cooling states, a primary coating stage, a secondary coating stage, an ink layer stage, one or more curing stages to cure coating liquids or ink layer liquids applied to the fiber, and a spool or other winding stage to receive and store the coated optical fiber. The pathway traversed by the optical fiber as it passes from the draw furnace through one or more process units to the winding stage is referred to herein as the process pathway of the optical fiber. The process pathway may be linear or may include turns.

The relative position of one process unit relative to another process unit along the process pathway is described herein as upstream or downstream. The upstream direction of the process pathway is the direction toward the preform and the downstream direction of the process pathway is the direction toward the winding stage. Positions or processing units upstream from a reference position or processing unit are closer, along the process pathway, to the preform than the reference position or processing unit. A process unit located at a position closer to the draw furnace along the process pathway is said to be upstream of a process unit located at a position further away from the draw furnace along the process pathway. The draw furnace is upstream from all other process units and the take-up spool (or winding stage or other terminal unit) is downstream of all other process units. By way of example, the process pathway of an optical fiber in an illustrative draw process extends from a draw furnace to a cooling unit, from the cooling unit to a coating application unit, from the coating application unit to a coating curing unit, and from the coating curing unit to a take-up spool. In the context of the terminology used herein, the draw furnace is upstream of the cooling unit, which is upstream of the coating application unit, which is upstream from the coating curing unit, which is upstream of the take-up spool. Similarly, the take-up spool is downstream of the coating curing unit, which is downstream of the coating application unit, which is downstream of the cooling unit, which is downstream of the draw furnace The present description provides a method for applying a coating liquid to an optical fiber. The method is used to apply a coating liquid to a glass fiber, a coating liquid to another coating liquid, or a coating liquid to a cured coating. The method includes directing an optical fiber along a process pathway that includes passing an optical fiber through a coating application unit. The coating application unit includes a guide die, a pressurized coating chamber and a sizing die. The pressurized coating chamber contains a coating liquid that is used to coat the optical fiber. The guide die is upstream of the pressurized coating chamber, which is upstream of the sizing die. The optical fiber passes through the guide die into the pressurized coating chamber, through the pressurized coating chamber to the sizing die, and through the sizing die to downstream units in a fiber draw process.

The present method enables high draw speed processes for manufacturing optical fibers. Draw speed is currently limited by two problems: (1) difficulties in wetting the optical fiber with the coating liquid as it exits the guide die and enters the coating chamber; and (2) increased severity of effects associated with gyres formed in the coating chamber in the vicinity of the sizing die as the optical fiber exits the coating chamber. The present method addresses both problems and allows for increased draw speed while minimizing coating defects. Draw speeds available from the current method are at least 30 m/s, or at least 40 m/s, or at least 50 m/s, or at least 60 m/s, or at least 70 m/s, or in the range from 30 m/s-90 m/s, or in the range from 40 m/s-80 m/s.

As the fiber exits the guide die and enters the coating chamber, it contacts the coating liquid. As the fiber wets, a meniscus of coating liquid forms on the fiber adjacent the exit of the guide die. Coating liquid is entrained by the fiber as it progresses along the process pathway to the sizing die. The fiber exits the sizing die with a layer of coating liquid adhered to it and is directed along the process pathway to a downstream processing unit (e.g. another coating unit or a curing unit). The thickness of coating liquid applied to the fiber is determined by the geometry of the sizing die, the viscosity of the coating liquid, the temperature of the fiber, and the draw speed. The diameter of the exit of the sizing die is particularly important in establishing the thickness of coating liquid applied to the fiber.

Successful coating and uniformity of coating thickness requires effective wetting of the fiber by the coating liquid as the fiber enters the coating chamber. The ambient of the fiber as it passes through the guide die is a gas (e.g. air, $CO_2$, He). By virtue of the motion of the fiber through the gas ambient, a gas boundary layer forms on the surface of the fiber as it passes through the guide die. The gas boundary layer remains with the fiber as it exits the guide die and enters the coating chamber.

Wetting refers to the process of displacing the gas boundary layer with the coating liquid as the fiber contacts and passes through the coating liquid. When the fiber is properly wetted with the coating liquid, a meniscus of coating liquid forms at the interface of the surface of the fiber and the coating liquid in the vicinity of the exit of the guide die and a boundary layer of coating liquid forms on the fiber from the tip of the meniscus as the optical fiber is conveyed toward the exit of the sizing die.

If the coating liquid fails to wet the fiber, a gas boundary layer remains on the fiber. This leads to entrainment of gas into the coating chamber and incorporation of gas in the coating liquid. The presence of gas in the coating liquid leads to the formation of bubbles in the coating liquid and to inclusion of the bubbles in the coating liquid applied to the fiber. The bubbles destabilize the meniscus and lead to non-uniformities in the coverage of coating liquid on the surface of the fiber. The bubbles entrapped in coating liquid adhered to the fiber remain in the coating when the coating liquid is cured downstream of the sizing die. Bubbles in the cured coating constitute defects that compromise the performance of the fiber and facilitate delamination of the cured coating. The presence of bubbles in the coating chamber also makes it difficult to center and stabilize the position of the fiber as it passes through the coating application unit, an effect that further contributes to non-uniformity in coating thickness.

As draw speed increases, the force needed to displace the gas boundary layer increases. In the present method, force sufficient to displace the gas boundary layer to enable wetting of the fiber at high draw speeds is achieved with a pressurized coating chamber. By increasing the pressure of the coating liquid in the coating chamber, greater force is available for applying the coating liquid to the fiber and consistent wetting of the fiber is maintained at the draw speeds disclosed herein. Pressurization of the coating chamber can be accomplished by equipping the coating chamber with a pressure transducer and using the pressure transducer to control the pressure of the coating chamber. In one embodiment, the stream of coating liquid delivered to the coating chamber is supplied from a pressurized source. By increasing the pressure of the coating chamber, the pressure of coating liquid in the coating chamber is increased and it becomes possible to overcome the pressure associated with the gas phase boundary layer to achieve wetting as draw speed is increased.

As used herein, pressurized coating chamber refers to a coating chamber having a pressure greater than 0 psig. In various embodiments, the pressure of the pressurized coating chamber is at least 0.10 psig, or at least 0.50 psig, or at least 1.0 psig, or at least 5.0 psig, or at least 10 psig, or at least 25 psig, or at least 50 psig, or at least 100 psig, or at least 200 psig, or in the range from 0.10 psig-300 psig, or in the range from 0.25 psig-275 psig, or in the range from 0.50 psig-250 psig, or in the range from 1.0 psig-225 psig, or in the range from 5.0 psig-200 psig, or in the range from 10 psig-175 psig, or in the range from 25 psig-150 psig or in the range from 50 psig-100 psig, where psig refers to gauge pressure in units of psi (pounds per square inch).

The higher pressure of coating liquid in the pressurized coating chamber leads to a higher meniscus pressure. Higher draw speeds are accordingly achieved by stabilizing a meniscus of coating liquid having a high pressure. The pressure of the meniscus of the coating liquid provided by the present method is greater than 0 psig, or at least 0.10 psig, or at least 0.50 psig, or at least 1.0 psig, or at least 5.0 psig, or at least 10 psig, or at least 25 psig, or at least 50 psig, or at least 100 psig, or at least 200 psig, or in the range from 0.1 psig-500 psig, or in the range from 1.0 psig-400 psig, or in the range from 5.0 psig-300 psig, or in the range from 10 psig-200 psig.

Measures taken to increase meniscus pressure are complicated by effects that occur in the vicinity of the sizing die as the optical fiber exits the coating chamber. As noted above, as a wetted fiber moves from the guide die to the sizing die, a meniscus of coating liquid forms on the fiber and a boundary layer of coating liquid develops at the tip of the meniscus. The boundary layer extends with the fiber as it passes through the coating liquid. FIG. 1 shows a calculated (finite element) boundary layer of a coating liquid on an optical fiber as it passes through a coating chamber. Optical fiber 10 enters coating chamber 20 through guide die exit 30, passes through coating chamber 20 to sizing die 40 and exits through sizing die exit 50. Coating chamber 20 contains a coating liquid and optical fiber 10 is wetted with the coating liquid as it enters coating chamber 20 through guide die exit 30. For purposes of the calculation, wetting of optical fiber 10 includes complete displacement of the gas boundary layer associated with optical fiber 10 in the guide die by the coating liquid and occurs without formation of bubbles in coating chamber 20.

As optical fiber 10 passes through coating chamber 20, a boundary layer 60 of coating liquid forms. The thickness of boundary layer 60 increases as optical fiber 10 progresses toward sizing die 40. To a first order approximation, the thickness of the boundary layer is proportional to $(vX/V_f)$, where $v$ is the kinematic viscosity of the coating liquid, $X$ is the distance along the fiber pathway of a position in the boundary layer relative to the point of initiation of the boundary layer at the meniscus tip in the vicinity of the guide die exit, and $V_f$ is the draw speed of the fiber.

Sizing die 40 includes tapered surface 70 that constricts the space available for coating liquid. As constriction occurs, a portion 80 of the coating fluid from boundary layer 60 is expelled from sizing die 40 back into coating chamber 20. The expelled coating fluid forms gyres in coating chamber 20 adjacent to sizing die 40. A gyre is a loop-like localized flow pattern of coating liquid with nearly closed streamlines. As coating liquid recirculates within the gyre during the draw process, shear stresses associated with the flow lead to an increase in the temperature of the coating liquid in the gyre.

The shape of the gyre and distribution of temperatures within the gyre depends on the design of the sizing die. The size and severity of gyres, for example, depends on the degree of constriction in the space available to the coating liquid. For thinner fiber coatings, narrower sizing dies are required and greater constriction occurs. Greater constriction leads to expulsion of a larger amount of coating liquid from the boundary layer as the fiber enters the tapered section of the sizing die and to more pronounced gyre formation.

Figure 2:
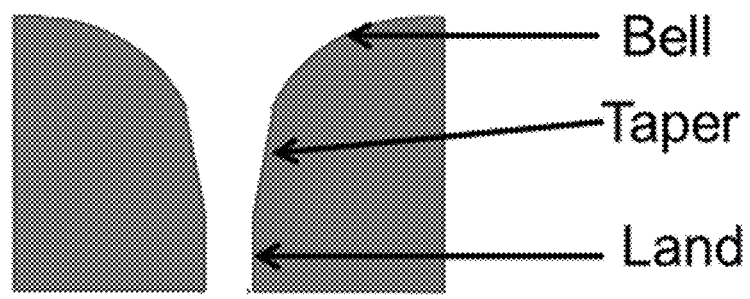
FIG. 2 shows a conventional design of a sizing die.
Figure 3:
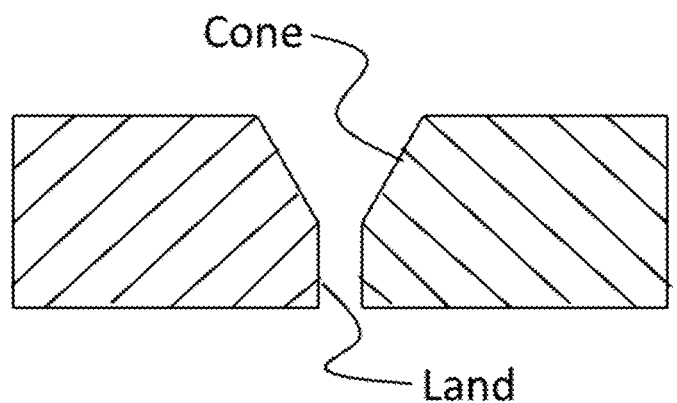
FIG. 3 shows a cone-only design of a sizing die.

The shape of the sizing die also influences the position, shape and temperature distribution of a gyre. FIG. 2 illustrates a conventional design for a sizing die. The conventional design includes a bell section, a taper section, and a land section. FIG. 3 illustrates a cone-only design for a sizing die. The cone-only design lacks a bell section and includes a cone section and a land section. Further information on the cone-only design can be found in U.S. Published Patent Application No. 20150147467A1, the disclosure of which is incorporated by reference herein.

Figure 4:
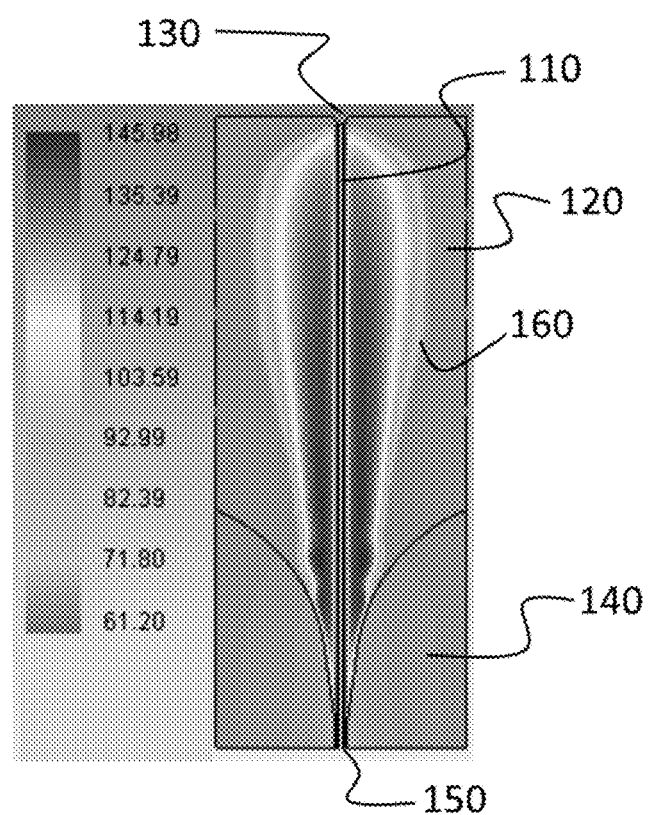
FIG. 4 shows a calculated temperature profile of a gyre formed by a sizing die having a conventional design.

FIG. 4 shows the calculated shape and temperature profile of a gyre formed adjacent to a sizing die having the conventional design shown in FIG. 2. Optical fiber 110 enters a coating chamber section 120 through guide die exit 130 and passes through exit 150 of conventional sizing die 140. The draw speed of optical fiber 110 is 50 m/s. A gyre having outer boundary 160 forms around optical fiber 110. Shading within the gyre indicates the temperature profile that develops in the gyre at steady state. Darker shading corresponds to higher temperature for coating liquid present in the gyre. The temperature scale shown at left indicates temperatures in units of ° C. The temperature of coating liquid is highest near optical fiber 110 and decreases away from optical fiber 110. The gyre is surrounded by coating liquid. Boundary 160 of the gyre corresponds to position at which equalization of the temperature of coating liquid in the gyre and the temperature of the surrounding coating liquid occurs. For purposes of the calculation, the temperature of the coating liquid surrounding the gyre was set at 60° C. FIG. 4 indicates that the gyre formed by a conventional die is elongated along the process pathway of the fiber and that the spatial extent of the gyre is confined to regions close to the fiber. FIG. 4 also indicates that the highest temperatures in the gyre are approximately 100° C. warmer than the temperature of the coating fluid away from the gyre.

Figure 5:
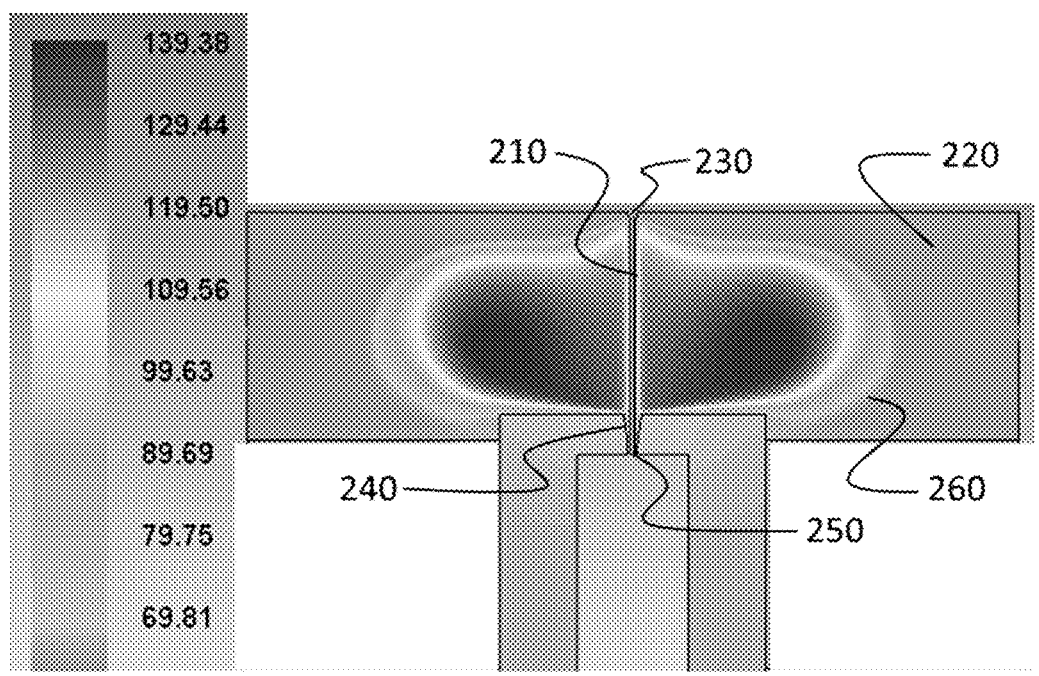
FIG. 5 shows a calculated temperature profile of a gyre formed by a sizing die having a cone-only design.

FIG. 5 shows the calculated shape and temperature profile of a gyre formed adjacent to a sizing die having the cone-only design shown in FIG. 3. Optical fiber 210 enters a coating chamber section 220 through guide die exit 230 and passes through exit 250 of cone-only sizing die 240. A gyre having outer boundary 260 forms around optical fiber 210. Shading within the gyre indicates the temperature profile that develops in the gyre at steady state. The temperature scale shown at left indicates temperatures in units of ° C. Darker shading corresponds to higher temperature for coating liquid present in the gyre. The temperature of coating liquid is generally higher near optical fiber 210 and decreases away from optical fiber 210 until equalization with the temperature of the surrounding coating liquid occurs at outer boundary 260 of the gyre. For purposes of the calculation, the temperature of the coating liquid surrounding the gyre was set at 60° C. FIG. 5 indicates that the gyre formed by a cone-only die is elongated in a direction transverse to the process pathway of the fiber. Relative to the conventional die, the gyre formed by a cone-only die is less tightly confined to spaces close to the fiber. The gyre extends for significant distances in lateral directions away from the process pathway. FIG. 5 also indicates that the highest temperatures in the gyre are approximately 80° C. warmer than the temperature of the coating fluid away from the gyre. The extent of heating of coating liquid in the gyre is less for the cone-only sizing die than for the conventional sizing die shown in FIG. 4.

The heating of coating liquid that occurs in the gyre is detrimental to the stability of the meniscus and leads to flooding of the guide die. Flooding is a process failure in which coating liquid is forced through the guide die exit into the guide die by the pressure of the coating liquid in the coating chamber. Flooding typically leads to breakage of the fiber, which necessitates process shut down. Flooding becomes more likely due to the presence of gyres because as the coating liquid heats in a gyre, its viscosity decreases. The extent of heating and decrease in viscosity become more pronounced as the draw speed increases because higher draw speeds increase the circulatory flow rate within the gyre, which leads to greater shear effects and more heating due to viscous dissipation. For draw speeds typical of current manufacturing processes, the temperature increase associated with gyres (~70° C. and higher) is sufficient to reduce the viscosity of the coating liquid by an order of magnitude or more. As draw speed increases above current values, heating and thermal effects associated with gyres become more pronounced.

Heating and a reduction in the viscosity of the coating liquid increase the likelihood of flooding because they (1) make the coating liquid more buoyant than the surrounding coating liquid and (2) reduce the pressure needed to induce back flow of the coating liquid into the guide die. As a result, if warmer, less viscous coating liquid escapes from the gyre and enters the surrounding coating liquid, it tends to flow upward in the coating chamber to the guide die. If the warmer, less viscous coating liquid reaches the meniscus, it destabilizes the meniscus and leads to dewetting of the fiber. As the fiber dewets, the drag force associated with the liquid boundary layer needed to resist back flow of coating liquid into the guide die is lost and the pressure needed to force the coating liquid up through the guide die exit into the guide die is reduced. Flooding accordingly ensues.

Bubbles in the coating liquid also promote flooding. The presence of bubbles leads to random, chaotic motion of coating liquid within and around the gyre. The random, chaotic motion facilitates escape of warmer, viscous coating liquid from the gyre and promotes migration of warmer, viscous coating liquid toward the meniscus.

To maintain a stable meniscus and uninterrupted, continuous wetting of the fiber, it is necessary to limit the effects of gyres on the coating process. The present method mitigates deleterious effects of gyres by supplying a transverse flow of coating liquid to the space between the exit of the guide die and the entrance to the sizing die. Transverse flow refers to flow of coating liquid in a direction transverse to the process pathway of the fiber as it passes through the coating chamber. Transverse direction refers to any direction that is not parallel to the process pathway of the fiber. The transverse flow of coating liquid mixes or interacts with coating fluid in the gyre. In one embodiment, the transverse flow of coating liquid enters a gyre, mixes with coating liquid in the gyre, flows across the gyre, exits the gyre, and removes or otherwise displaces a portion of coating liquid from the gyre. In another embodiment, the transverse flow of coating liquid is directed around the gyre without entering the gyre. In one embodiment, establishing transverse flow includes adding coating liquid from an external source to existing coating liquid in the coating chamber and removing coating liquid from the coating chamber. The removed coating liquid is coating liquid originally present in the coating chamber, coating liquid added to the coating chamber, or a combination thereof. In one embodiment, a transverse flow of coating liquid is supplied to a pressurized coating chamber.

The transverse flow of coating liquid mitigates the effect of the gyre in several ways. First, the temperature of the coating liquid in the transverse flow at its point of entry to the coating chamber can be controlled and maintained at a temperature below the maximum, average or minimum temperature of coating fluid contained in the gyre. When the cooler coating fluid of the transverse flow interacts with the warmer coating fluid of the gyre, the gyre cools. As the gyre cools, the coating liquid in the gyre becomes less buoyant and more viscous. This reduces the likelihood of escape of the coating liquid from the gyre. To the extent that coating liquid does escape from the gyre, the reduced buoyancy lower temperature and higher viscosity lessen the likelihood that coating liquid from the gyre will reach the meniscus. If coating liquid from the gyre does reach the meniscus, the lower temperature and higher viscosity mean that higher pressure is needed to force it into the guide die. The likelihood of flooding is accordingly reduced. By maintaining a continuous transverse flow of coating liquid and continuously removing coating liquid, the temperature of coating fluid within the gyre can be managed.

Second, the cooling of the coating fluid provided by the transverse flow also reduces temperature gradients in the gyre and the difference between the average temperature of the gyre and the surrounding coating fluid. The greater equalization in temperature leads to a more homogeneous coating liquid with more stable and consistent properties (e.g. gyre flow pattern, density, viscosity). Better homogeneity improves uniformity and concentricity of coating.

Third, displacement and removal of coating liquid in the coating chamber, whether in the gyre or surrounding the gyre, decreases the concentration of bubbles in the coating chamber. The coating fluid of the transverse flow has not been subjected to entrained gases in the coating chamber and enters the coating chamber essentially free of bubbles. Transverse flow of coating fluid thus dilutes the concentration of bubbles in the coating chamber. Removal from the coating chamber of coating fluid of coating liquid that contains bubbles leads to a reduction in bubble concentration. A lower bubble concentration minimizes the likelihood of dewetting and flooding. A lower bubble concentration also eliminates random, chaotic motion in the gyre, which leads to better concentricity through a more consistent, stabilized flow pattern in the gyre and a reduced tendency for coating fluid to escape from the gyre.

Fourth, replenishment of coating liquid in the coating chamber lowers the concentration of dissolved gases in the coating fluid. As noted above, gas can enter the coating chamber through entrainment by the fiber as it exits the guide die. Entrainment can lead to dewetting and is undesirable. Gas can enter the coating chamber, however, even when the fiber is properly wetted. Wetting of the fiber includes formation of a meniscus of coating liquid on the fiber as the fiber enters the coating liquid. As the meniscus forms, the gas boundary layer on the fiber is displaced. The meniscus, however, is exposed to gas from the displaced boundary layer. Common process gases present in the guide die (e.g. air, $CO_2$, He) are soluble in the coating liquids typically used to coat fibers. As the draw process is operated over time, the concentration of gas dissolved in the coating liquid increases and ultimately reaches a saturation level.

Two adverse effects occur when the coating liquid is saturated with gas. First, dissolution of gas into the coating liquid is one of the steps associated with the wetting process. The speed of wetting is related to the permeability of the gas from the gas boundary layer of the fiber into the coating liquid. (See, for example, Jacqmin, D.; Journal of Fluid Mechanics, 455, 347-358 (2002).) Gas permeability is proportional to solubility and rate of diffusion of the gas in the coating liquid. If the coating liquid is saturated with gas, further gas is unable to dissolve in the coating liquid and gas from the gas boundary layer of the fiber cannot enter the coating liquid. Dewetting can occur as a result. Second, the inability of gas to dissolve in the coating liquid increases the likelihood of bubble formation in the coating liquid. Dissolution of gas in the coating liquid removes gas that might otherwise form bubbles in the coating liquid. Through dissolution, bubble formation is inhibited. If the coating liquid becomes saturated with gas, however, dissolution is no longer possible and incorporation of gas in the form of bubbles in the coating liquid becomes more prevalent. Replenishment of saturated coating liquid with fresh coating liquid aids wetting and suppresses bubble formation by avoiding saturation and maintaining consistent dissolution of gas into the coating liquid.

Fifth, the reduction in the temperature of coating liquid in the coating chamber increases the solubility of common process gases in the coating liquid. Higher solubility leads to greater dissolution of gases in the coating liquid and longer times before saturation occurs. This allows for longer operational times before concerns about dewetting and bubble entrapment associated with saturation of the coating liquid arise.

Establishing transverse flow of coating liquid includes directing a stream of coating liquid in the space between the exit of the guide die and the entrance of the sizing die. This space defines a channel through which coating liquid flows in a transverse direction. The process pathway is coincident with the optical fiber and extends from the exit of the guide die to the entrance of the sizing die. The transverse flow sweeps across, through, and/or around the process pathway to mix with, dilute, remove or otherwise interact (thermally or mechanically) with coating liquid present in the coating chamber. The rate of transverse flow is adjusted to counteract detrimental effects of gyres. Greater transverse flow rates are preferred as draw speed increases. In various embodiments, the rate of transverse flow is greater than $0.1$ $cm^3/s$, or greater than $0.2$ $cm^3/s$, or greater than $0.3$ $cm^3/s$, or greater than $0.4$ $cm^3/s$, or greater than $0.5$ $cm^3/s$, or greater than $0.75$ $cm^3/s$, or greater than $1.0$ $cm^3/s$, greater than $2.5$ $cm^3/s$, or greater than $5.0$ $cm^3/s$, or in the range from $0.1$ $cm^3/s$-$20$ $cm^3/s$, or in the range from $0.1$ $cm^3/s$-$10$ $cm^3/s$, or in the range from $0.1$ $cm^3/s$-$5.0$ $cm^3/s$, or in the range from $0.2$ $cm^3/s$-$20$ $cm^3/s$, or in the range from $0.2$ $cm^3/s$-$10$ $cm^3/s$, or in the range from $0.2$ $cm^3/s$-$5.0$ $cm^3/s$, or in the range from $0.5$ $cm^3/s$-$20$ $cm^3/s$, or in the range from $0.5$ $cm^3/s$-$10$ $cm^3/s$, or in the range from $0.5$ $cm^3/s$-$5.0$ $cm^3/s$.

Figure 6:
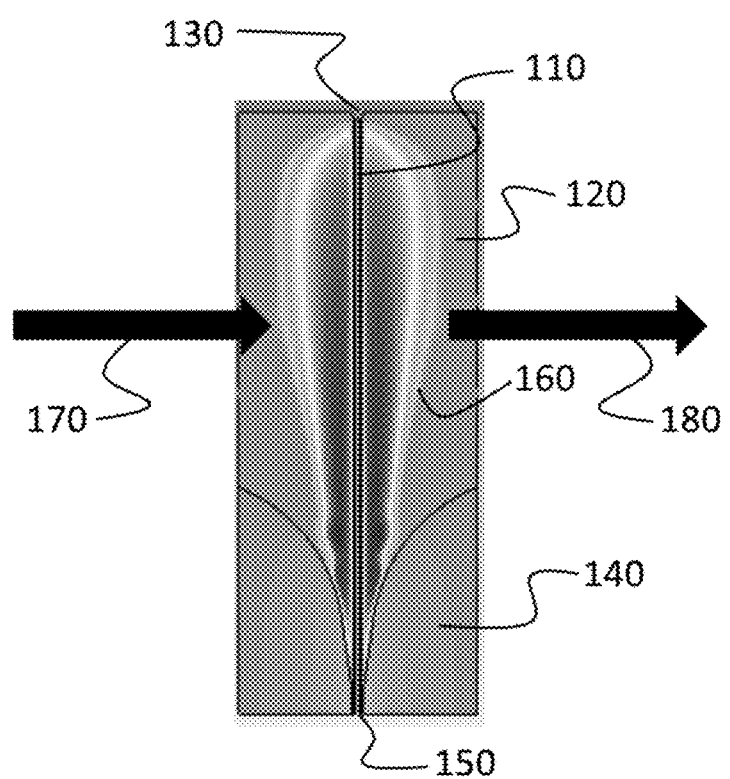
FIG. 6 depicts transverse flow of a coating liquid in a coating chamber operatively coupled to a sizing die having a conventional design.
Figure 7:
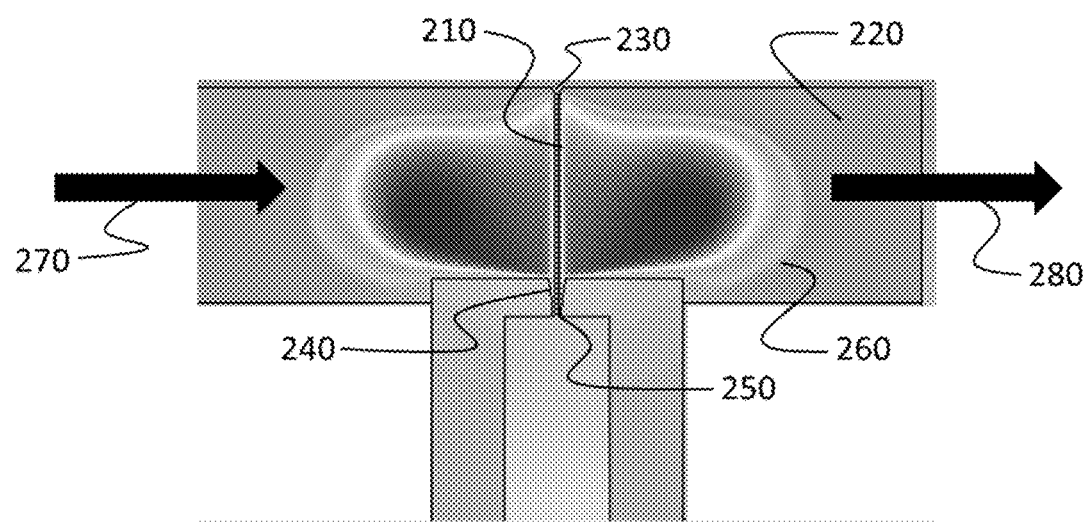
FIG. 7 depicts transverse flow of a coating liquid in a pressurized coating chamber operatively coupled to a cone-only sizing die.

FIG. 6 depicts a modification of the configuration shown in FIG. 4 that includes transverse flow of coating liquid in a channel between guide die exit 130 and sizing die 140. The transverse flow includes introduction 170 of coating liquid and removal 180 of coating liquid from the gyre and/or coating chamber. Similarly, FIG. 7 depicts a modification of the configuration shown in FIG. 5 that includes transverse flow of coating liquid in a channel between guide die exit 230 and sizing die 240. The transverse flow includes introduction 270 of coating liquid and removal 280 of coating liquid from the gyre and/or coating chamber. In one embodiment, the transverse flow rate corresponds to the rate of introduction of coating liquid at the inlet to the coating chamber. In another embodiment, the transverse flow rate corresponds to the rate of removal of coating liquid from the coating chamber. In a further embodiment, the transverse flow rate is measured by placing a sensor or flow meter within the coating chamber in the vicinity of the gyre.

In various embodiments, the rate of introduction of coating liquid used to generate the transverse flow is greater than $0.1$ $cm^3/s$, or greater than $0.2$ $cm^3/s$, or greater than $0.3$ $cm^3/s$, or greater than $0.4$ $cm^3/s$, or greater than $0.5$ $cm^3/s$, or greater than $0.75$ $cm^3/s$, or greater than $1.0$ $cm^3/s$, greater than $2.5$ $cm^3/s$, or greater than $5.0$ $cm^3/s$, or in the range from $0.1$ $cm^3/s$-$20$ $cm^3/s$, or in the range from $0.1$ $cm^3/s$-$10$ $cm^3/s$, or in the range from $0.1$ $cm^3/s$-$5.0$ $cm^3/s$, or in the range from $0.2$ $cm^3/s$-$20$ $cm^3/s$, or in the range from $0.2$ $cm^3/s$-$10$ $cm^3/s$, or in the range from $0.2$ $cm^3/s$-$5.0$ $cm^3/s$, or in the range from $0.5$ $cm^3/s$-$20$ $cm^3/s$, or in the range from $0.5$ $cm^3/s$-$10$ $cm^3/s$, or in the range from $0.5$ $cm^3/s$-$5.0$ $cm^3/s$.

In various embodiments, the rate of removal of coating liquid from the coating chamber is greater than $0.1$ $cm^3/s$, or greater than $0.2$ $cm^3/s$, or greater than $0.3$ $cm^3/s$, or greater than $0.4$ $cm^3/s$, or greater than $0.5$ $cm^3/s$, or greater than $0.75$ $cm^3/s$, or greater than $1.0$ $cm^3/s$, greater than $2.5$ $cm^3/s$, or greater than $5.0$ $cm^3/s$, or in the range from $0.1$ $cm^3/s$-$20$ $cm^3/s$, or in the range from $0.1$ $cm^3/s$-$10$ $cm^3/s$, or in the range from $0.1$ $cm^3/s$-$5.0$ $cm^3/s$, or in the range from $0.2$ $cm^3/s$-$20$ $cm^3/s$, or in the range from $0.2$ $cm^3/s$-$10$ $cm^3/s$, or in the range from $0.2$ $cm^3/s$-$5.0$ $cm^3/s$, or in the range from $0.5$ $cm^3/s$-$20$ $cm^3/s$, or in the range from $0.5$ $cm^3/s$-$10$ $cm^3/s$, or in the range from $0.5$ $cm^3/s$-$5.0$ $cm^3/s$.

Figure 8:
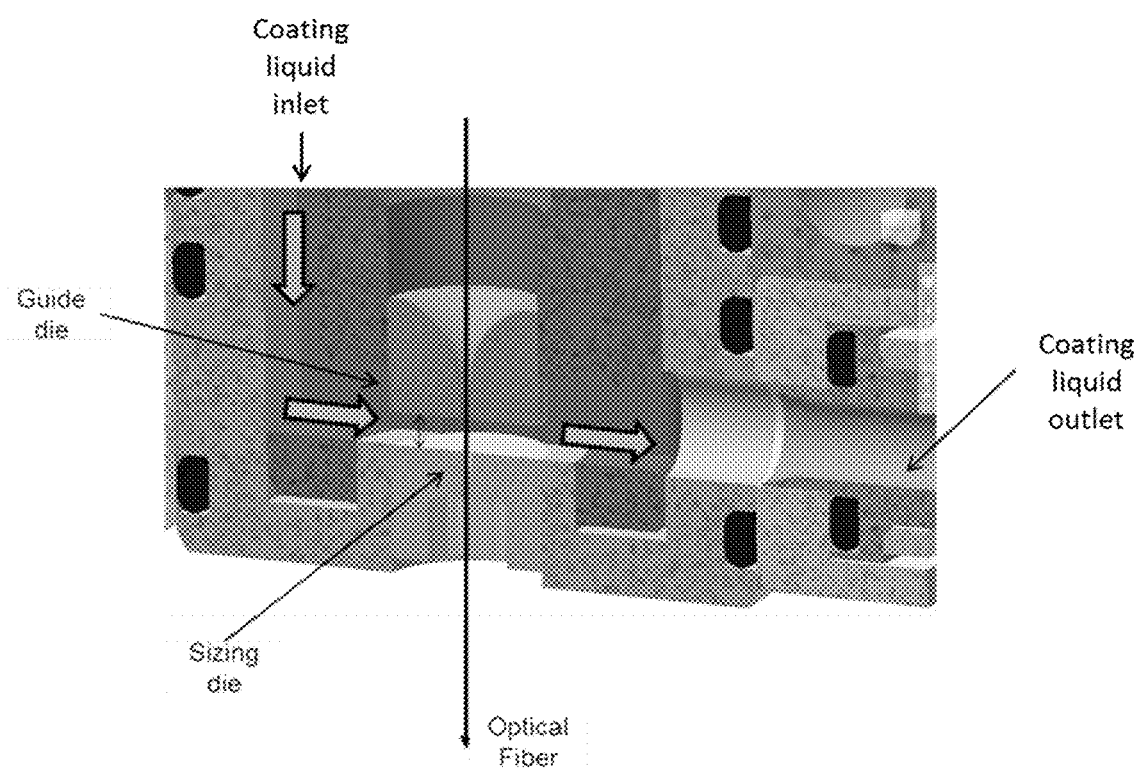
FIG. 8 depicts transverse flow of a coating liquid through a channel in a pressurized coating chamber positioned between a guide die and sizing die.

To accommodate a transverse flow of coating liquid in one embodiment, the coating chamber is adapted to include an inlet for delivering a transverse flow of coating liquid and an outlet for removing the transverse flow of coating liquid. The inlet and outlet are distinct from the entrance and exit points of the fiber into the coating chamber. FIG. 8 shows an embodiment of a coating chamber that includes an inlet for supplying coating liquid to the coating chamber from an external source and an outlet for removing coating liquid from the coating chamber. The flow of the coating liquid is depicted with gray arrows in FIG. 8. The coating liquid flows from the inlet into the coating chamber and in a transverse direction in a channel between the guide die and the sizing die past the optical fiber. The coating liquid in the transverse flow exits the channel and is removed from the coating chamber at the outlet. The inlet for supplying coating liquid from an external source is distinct from the point of entry of the optical fiber to the coating chamber (guide die exit). The outlet for removing coating liquid from the coating chamber is distinct from the points of entry and exit of the optical fiber from the sizing die. At steady state, the amount of coating liquid removed at the outlet is approximately equal to the amount of coating liquid supplied at the inlet. An exact balancing of the amounts of coating liquid at the inlet and outlet does not occur due to removal of coating liquid in the form of a thin layer on the optical fiber at the sizing die and, if present, leakage of coating liquid into the guide die.

In the embodiments of FIGS. 4 and 5, the gyre occupies a substantial portion of the distance between the fiber entrance to the coating chamber and the fiber exit from the coating chamber.

Consequently, as shown in FIG. 8, to promote mitigation of the effects of the gyre on wetting of the fiber, it is preferable for the coating liquid in the transverse flow to interact with a significant portion of the gyre. In FIG. 8, the fiber entrance to the coating chamber corresponds to the exit of a guide die and the fiber exit from the coating chamber corresponds to the entrance to the sizing die. In one embodiment, interaction of the transverse flow with the gyre is determined by the overlap of the cross-section of transverse flow with the gyre. The transverse flow is characterized by a cross-section in a plane normal to the direction of transverse flow. The cross-section is a two-dimensional area defined by a perimeter having a shape and size. The shape and size of the perimeter are influenced by factors including the shape and size of the inlet that supplies the transverse flow to the coating chamber and the dimensions of the channel between the guide die and sizing die through which the transverse flow passes. In various embodiments, the shape of the perimeter is circular, elliptical, square, rectangular, or irregular. The size of the perimeter is characterized by a cross-sectional dimension. The cross-sectional dimension corresponds to the longest line segment that connects two points of the perimeter of the cross-section. For example, when the shape of the perimeter is circular, the cross-sectional dimension is diameter. When the shape of the perimeter is square or rectangular, the cross-sectional dimension is the diagonal length. When the shape of the perimeter is elliptical, the cross-sectional dimension is the length of the major axis of the ellipse.

To increase the interaction of the transverse flow of coating liquid with the gyre, the cross-sectional dimension of the transverse flow of coating liquid is greater than 30% of the distance between the exit of the guide die and the entrance of the sizing die, or greater than 40% of the distance between the exit of the guide die and the entrance of the sizing die, or greater than 50% of the distance between the exit of the guide die and the entrance of the sizing die, or greater than 70% of the distance between the exit of the guide die and the entrance of the sizing die, or greater than 90% of the distance between the exit of the guide die and the entrance of the sizing die, or in the range from 30%-100% of the distance between the exit of the guide die and the entrance of the sizing die, or in the range from 50%-100% of the distance between the exit of the guide die and the entrance of the sizing die, or in the range from 70%-100% of the distance between the exit of the guide die and the entrance of the sizing die, or in the range from 30%-90% of the distance between the exit of the guide die and the entrance of the sizing die.

In other embodiments, the cross-sectional dimension of the transverse flow of coating liquid is greater than 30% of the distance between the fiber entrance to the coating chamber and the fiber exit from the coating chamber, or greater than 40% of the distance between the fiber entrance to the coating chamber and the fiber exit from the coating chamber, or greater than 50% of the distance between the fiber entrance to the coating chamber and the fiber exit from the coating chamber, or greater than 70% of the distance between the fiber entrance to the coating chamber and the fiber exit from the coating chamber, or greater than 90% of the distance between the fiber entrance to the coating chamber and the fiber exit from the coating chamber, or in the range from 30%-100% of the distance between the fiber entrance to the coating chamber and the fiber exit from the coating chamber, or in the range from 50%-100% of the distance between fiber entrance to the coating chamber and the fiber exit from the coating chamber, or in the range from 70%-100% of the distance between fiber entrance to the coating chamber and the fiber exit from the coating chamber, or in the range from 30%-90% of the distance between the fiber entrance to the coating chamber and the fiber exit from the coating chamber.

In one embodiment, the cross-sectional dimension of the transverse flow of coating liquid is controlled by the dimensions of the inlet that supplies the transverse flow of coating liquid to the coating chamber. The inlet includes an opening at the interface with the coating chamber through which the transverse flow of coating liquid is supplied. The inlet has a cross-sectional area determined by the size and shape of the opening and is characterized by a cross-sectional dimension. The cross-sectional dimension of the inlet corresponds to the longest line segment that connects two points of the perimeter of the opening.

In different embodiments, the cross-sectional dimension of the inlet is greater than 30% of the distance between the fiber entrance to the coating chamber and the fiber exit from the coating chamber, or greater than 40% of the distance between the fiber entrance to the coating chamber and the fiber exit from the coating chamber, or greater than 50% of the distance between the fiber entrance to the coating chamber and the fiber exit from the coating chamber, or greater than 70% of the distance between the fiber entrance to the coating chamber and the fiber exit from the coating chamber, or greater than 90% of the distance between the fiber entrance to the coating chamber and the fiber exit from the coating chamber, or in the range from 30%-100% of the distance between the fiber entrance to the coating chamber and the fiber exit from the coating chamber, or in the range from 50%-100% of the distance between fiber entrance to the coating chamber and the fiber exit from the coating chamber, or in the range from 70%-100% of the distance between fiber entrance to the coating chamber and the fiber exit from the coating chamber, or in the range from 30%-90% of the distance between the fiber entrance to the coating chamber and the fiber exit from the coating chamber.

In different embodiments, the cross-sectional dimension of the inlet is greater than 30% of the distance between the exit of the guide die and the entrance of the sizing die, or greater than 40% of the distance between the exit of the guide die and the entrance of the sizing die, or greater than 50% of the distance between the exit of the guide die and the entrance of the sizing die, or greater than 70% of the distance between the exit of the guide die and the entrance of the sizing die, or greater than 90% of the distance between the exit of the guide die and the entrance of the sizing die, or in the range from 30%-100% of the distance between the exit of the guide die and the entrance of the sizing die, or in the range from 50%-100% of the distance between the exit of the guide die and the entrance of the sizing die, or in the range from 70%-100% of the distance between the exit of the guide die and the entrance of the sizing die, or in the range from 30%-90% of the distance between the exit of the guide die and the entrance of the sizing die.

The temperature and/or flow rate of coating liquid supplied at the inlet can be controlled to manage the thermal environment of coating liquid in the coating chamber or in the gyre. The temperature of coating liquid supplied at the inlet is less than the maximum temperature of coating liquid in the gyre, or less than the average temperature of coating liquid in the gyre, or less than the minimum temperature of coating liquid in the gyre, or less than the average temperature of the coating liquid in the coating chamber that is outside of the gyre.

Management of the thermal environment of the coating liquid includes minimizing the difference in temperature of coating liquid within the gyre. By including transverse flow of coating liquid in the channel between the guide die and sizing die, the difference between the maximum temperature of coating fluid in the gyre and the minimum temperature of coating fluid in the gyre is less than 80° C., or less than 60° C., or less than 50° C., or less than 40° C., or less than 30° C.

In different embodiments, the temperature of coating liquid supplied at the inlet of the coating chamber is less than the average temperature of coating fluid in the gyre by at least 5° C., at least 10° C., or at least 20° C., or at least 30° C., or by an amount in the range from 5° C.-40° C., or by an amount in the range from 10° C.-30° C.

Management of the thermal environment of the coating liquid includes minimizing the difference in the temperatures of coating liquid in the gyre and in the coating liquid surrounding the gyre. By including transverse flow of coating liquid in the channel between the guide die and the sizing die, the difference between the maximum temperature of coating fluid in the gyre and the temperature of coating fluid surrounding the gyre is less than 80° C., or less than 60° C., or less than 50° C., or less than 40° C., or less than 30° C.

A coating assembly featuring transverse flow of coating liquid in accordance with the present description is utilized in the application of one or more coatings to the optical fiber. A typical optical fiber includes a low modulus primary coating on the glass fiber and a high modulus secondary coating on the primary coating. A coloring layer is often formed on the secondary coating as well. The benefits associated with transverse flow of coating liquid extend to any of the coatings formed on an optical fiber. When applying multiple coatings to the fiber, a liquid primary coating composition is applied to the fiber at a point along the process pathway upstream of the point at which a liquid secondary coating composition is applied to the fiber. In one embodiment, the liquid primary coating composition is cured before applying the liquid secondary coating composition (wet-on-dry process). In another embodiment, the liquid primary coating composition is uncured before applying the liquid secondary coating composition (wet-on-wet process). If applied, the liquid coloring layer composition is applied at a position along the process pathway downstream from the point of application of the liquid secondary coating composition. In one embodiment, the liquid secondary coating composition is cured before applying the liquid coloring layer composition (wet-on-dry process). In another embodiment, the liquid secondary coating composition is uncured before applying the liquid coloring layer composition (wet-on-wet process).

Figure 9:
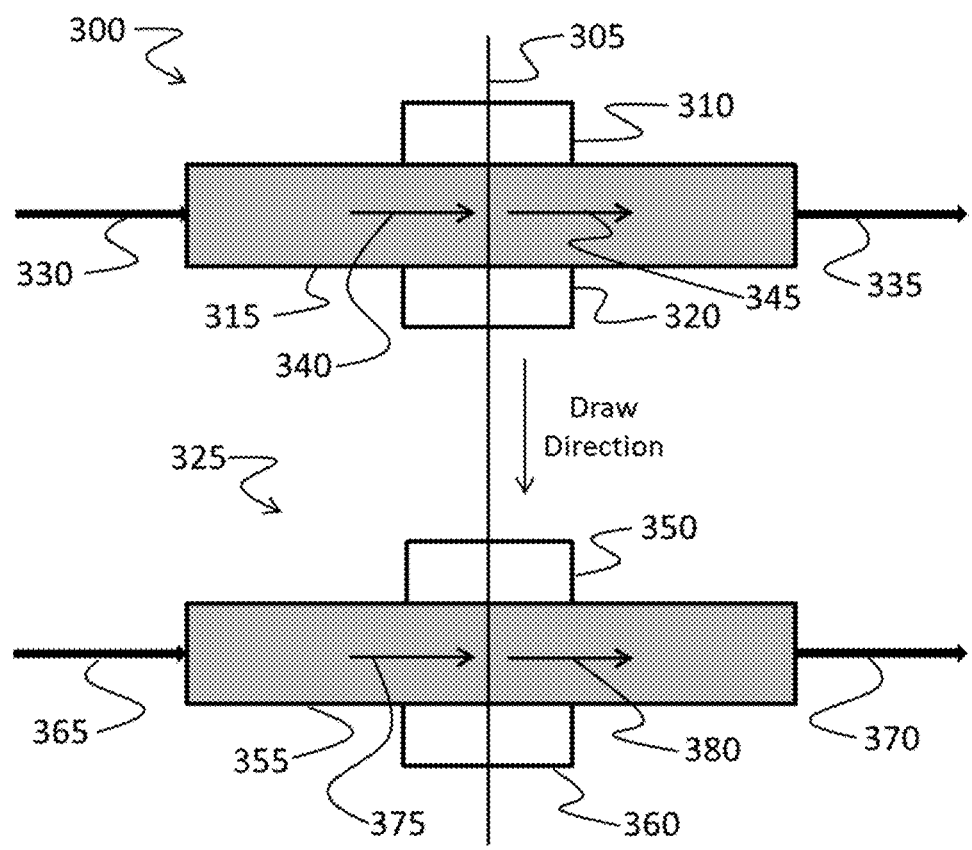
FIG. 9 depicts a coating unit with pressurized coating chambers for applying a primary coating liquid and a secondary coating liquid to an optical fiber.

FIG. 9 illustrates an embodiment in which primary and secondary coating liquids are applied to an optical fiber in a wet-on-wet process. Coating unit 300 is used to apply a liquid primary coating composition to optical fiber 305. Optical fiber 305 is drawn in the direction indicated at a particular draw speed. Optical fiber 305 is drawn through guide die 310 into coating chamber 315, drawn through coating chamber 315 to sizing die 320, and drawn through sizing die 320 to downstream coating unit 325. A primary coating liquid is applied to optical fiber 305 in coating chamber 315. Primary coating liquid is supplied to coating chamber 315 at inlet 330 and removed from coating chamber 315 at outlet 335. The primary coating liquid flows in transverse directions 340 and 345 in coating chamber 315. Optical fiber 305 enters coating unit 325 at guide die 350, is drawn through guide die 350 to coating chamber 355, is drawn through coating chamber 355 to sizing die 360, and drawn through sizing die 360 to downstream processing units (not shown). A secondary coating liquid is applied to optical fiber 305 in coating chamber 355. Secondary coating liquid is supplied to coating chamber 355 at inlet 365 and removed from coating chamber 355 at outlet 370. The secondary coating liquid flows in transverse directions 375 and 380 in coating chamber 355. Although transverse flow of coating liquid is depicted as occurring in the same or similar transverse directions in coating chambers 315 and 355, it is understood that transverse flow of coating liquid can occur in different directions in coating chambers 315 and 355.

Figure 10:
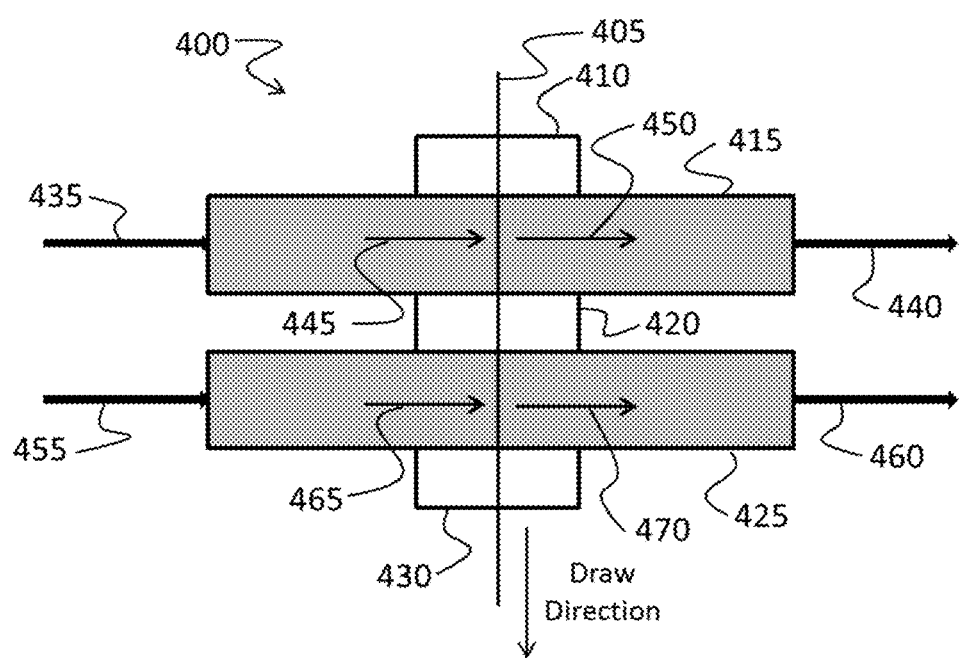
FIG. 10 depicts a coating unit with pressurized coating chambers for applying a primary coating liquid and a secondary coating liquid to an optical fiber.

FIG. 10 illustrates another embodiment in which primary and secondary coating liquids are applied to an optical fiber in a wet-on-wet process. Coating unit 400 is used to apply liquid primary and secondary coating compositions to optical fiber 405. Optical fiber 405 is drawn in the direction indicated at a particular draw speed. Optical fiber 405 is drawn through guide die 410 into coating chamber 415, drawn through coating chamber 415 to hybrid die 420, drawn through hybrid die 420 to coating chamber 425, drawn through coating chamber 425 to sizing die 430, and drawn through sizing die 430 to downstream process units (not shown). Hybrid die 420 acts as a sizing die for optical fiber 405 as it exits coating chamber 415 and a guide die for optical fiber 405 as it enters coating chamber 425. A primary coating liquid is applied to optical fiber 405 in coating chamber 415. Primary coating liquid is supplied to coating chamber 415 at inlet 435 and removed from coating chamber 415 at outlet 440. The primary coating liquid flows in transverse directions 445 and 450 in coating chamber 415. Optical fiber 405 enters coating chamber 425 through hybrid die at 420. A secondary coating liquid is applied to optical fiber 405 in coating chamber 425. Secondary coating liquid is supplied to coating chamber 425 at inlet 455 and removed from coating chamber 425 at outlet 460. The secondary coating liquid flows in transverse directions 465 and 470 in coating chamber 425. Although transverse flow of coating liquid is depicted as occurring in the same or similar transverse directions in coating chambers 415 and 425, it is understood that transverse flow of coating liquid can occur in different directions in coating chambers 415 and 425.

In another embodiment, coating liquid removed from the coating chamber is recycled to the coating chamber. Coating liquid removed from the coating chamber is directed to a return loop that delivers the removed coating liquid directly to the coating chamber or to an external source of coating liquid operatively coupled to an inlet of the coating chamber.

In a preferred embodiment, the guide die is free of coating liquid. In another preferred embodiment, flooding of the guide die does not occur. In a further preferred embodiment, coating liquid associated with the transverse flow does not enter the guide die.

Preferred coating liquids are curable coating liquids. Curable coating liquids include one or more curable components. As used herein, the term "curable" is intended to mean that the component, when exposed to a suitable source of curing energy, includes one or more curable functional groups capable of forming covalent bonds that participate in linking (bonding) the component to itself or to other components to form a polymeric coating material. The cured product obtained by curing a curable coating liquid is a coating. The curing process is induced by any of several forms of energy. Forms of energy include radiation or thermal energy. A radiation-curable component is a component that is induced to undergo a curing reaction when exposed to radiation of a suitable wavelength at a suitable intensity for a sufficient period of time. The radiation curing reaction preferably occurs in the presence of a photoinitiator. A radiation-curable component is optionally also thermally curable. Similarly, a thermally-curable component is a component that is induced to undergo a curing reaction when exposed to thermal energy of sufficient intensity for a sufficient period of time. A thermally curable component is optionally also radiation curable. Curable components include monomers, oligomers, and polymers.

A curable component includes one or more curable functional groups. A curable component with only one curable functional group is a monofunctional curable component. A curable component having two or more curable functional groups is a multifunctional curable component. Multifunctional curable components include two or more functional groups capable of forming covalent bonds during the curing process and can introduce crosslinks into the polymeric network formed during the curing process. Multifunctional curable components are also referred to as "crosslinkers" or "curable crosslinkers". Examples of functional groups that participate in covalent bond formation during the curing process are identified below.

The coating composition includes a single monomer or a combination of monomers. The monomers include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

In one embodiment, the monomer component of the curable coating liquid includes ethylenically unsaturated monomers. The monomers include functional groups that are polymerizable groups and/or groups that facilitate or enable crosslinking. The monomers are monofunctional monomers or polyfunctional monomers. In combinations of two or more monomers, the constituent monomers are monofunctional monomers, polyfunctional monomers, or a combination of monofunctional monomers and polyfunctional monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers for the curable coating liquid include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bomyl acrylate, isobornyl acrylate (e.g., SR423, Sartomer Company, Inc.), tetrahydrofiurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), iso-propoxylene (—O—CH$_2$—CH(CH$_3$)—), etc. As used herein, the degree of alkoxylation refers to the number of alkoxylene groups in the monomer. In one embodiment, the alkoxylene groups are bonded consecutively in the monomer.

Representative polyfunctional ethylenically unsaturated monomers for the curable coating liquid include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

In embodiments, the monomer component of the coating liquid includes compounds having the general formula $R_2$—$R_1$—O—(CH$_2$CH$_3$CH—O)$_q$—COCH=CH$_2$, where $R_1$ and $R_2$ are aliphatic, aromatic, or a mixture of both, and q=1 to 10, or $R_1$—O—(CH$_2$CH$_3$CH—O)$_q$—COCH=CH$_2$, where $R_1$ is aliphatic or aromatic, and q=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

In some embodiments, the monomer component of the coating liquid includes a multifunctional (meth)acrylate. As used herein, the term "(meth)acrylate" means acrylate or methacrylate. Multifunctional (meth)acrylates are (meth) acrylates having two or more polymerizable (meth)acrylate moieties per molecule, or three or more polymerizable (meth)acrylate moieties per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol di(meth)acrylate, propoxylated hexanediol di(meth)acrylate, tetrapropyleneglycol di(meth)acrylate, pentapropyleneglycol di(meth) acrylate.

In an embodiment, the monomer component of the coating liquid includes an N-vinyl amide such as an N-vinyl lactam, or N-vinyl pyrrolidinone, or N-vinyl caprolactam.

The curable coating liquid optionally includes one or more oligomers. One class of optional oligomers is ethylenically unsaturated oligomers. Suitable optional oligomers include monofunctional oligomers, polyfunctional oligomers, or a combination of a monofunctional oligomer and a polyfunctional oligomer. In some embodiments, the optional oligomer includes aliphatic and aromatic urethane (meth) acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth) acrylate oligomers or combinations thereof. The curable coating liquid may be free of urethane groups, groups that react to form urethane groups, urethane acrylate compounds, urethane oligomers, or urethane acrylate oligomers.

The polymerization initiator facilitates initiation of the polymerization process associated with the curing of the coating composition to form the coating. Polymerization initiators include thermal initiators, chemical initiators, electron beam initiators, and photoinitiators. Photoinitiators include ketonic photoinitiating additives and/or phosphine oxide additives. When used in the photoformation of the coating of the present disclosure, the photoinitiator is present in an amount sufficient to enable rapid radiation curing. The wavelength of curing radiation is infrared, visible, or ultraviolet.

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); (2,4,6-triiethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to monomer(s), oligomer(s) and/or oligomeric material(s), and polymerization initiator(s), the coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent.

Embodiments of the present method include curing the coating liquid on the optical fiber. In one embodiment, the curable coating liquid is cured with an LED or laser source. In one embodiment, the LED source is a UVLED source. The peak wavelength of the LED or laser source is a wavelength less than 410 nm, or less than 405 nm, or less than 400 nm, or less than 395 nm, or in the range from 340 nm-410 nm, or in the range from 350 nm-405 nm, or in the range from 360 nm-405 nm, or in the range from 365 nm-400 nm, or in the range from 370 nm-395 nm, or in the range from 375 nm-390 nm, or in the range from 375 nm-400 nm, or in the range from 380 nm-400 nm.

Representative radiation-curable ethylenically unsaturated monomers included alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—), etc. As used herein, the degree of alkoxylation refers to the number of alkoxylene groups in the monomer. In one embodiment, the alkoxylene groups are bonded consecutively in the monomer. cf. ID27449 for description of secondary coating.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method of processing an optical fiber, comprising the steps of:
    drawing an optical fiber in a drawing direction along a process pathway through a coating chamber, the coating chamber comprising a coating liquid, the coating liquid coating the optical fiber, the optical fiber entering the coating chamber through a guide die and exiting the coating chamber through a sizing die; and
    directing a separate flow of the coating liquid through the coating chamber in a direction transverse to the direction of the drawing direction of the optical fiber, the separate transverse flow of the coating liquid sweeping across and through the process pathway of the optical fiber to mix with the coating liquid in the coating chamber;
    wherein the separate transverse flow of the coating liquid is flowed in the transverse direction at a rate greater than 0.1 cm$^3$/s; and
    wherein the separate transverse flow of the coating liquid is introduced into the coating chamber at an inlet and the separate transverse flow of the coating liquid is removed from the coating chamber at an outlet opposite the inlet.

2. The method according to claim 1, wherein the separate transverse flow of the coating liquid is flowed in the transverse direction at a rate greater than 0.5 cm$^3$/s.

3. The method according to claim 1, wherein the coating chamber is pressurized to a pressure greater than 0 psig.

4. The method according to claim 1, wherein the coating chamber is pressurized to a pressure greater than 1.0 psig.

5. The method according to claim 1, wherein the inlet and the outlet are spaced apart from the guide die and the sizing die.

6. The method according to claim 1, wherein the separate transverse flow of the coating liquid is directed through a channel positioned in the coating chamber between the guide die and the sizing die.

7. The method according to claim 1, wherein the guide die or the sizing die comprises a cone-only die, the cone-only die comprising a cone section and a land section, the cone-only die lacking a bell section.

8. The method according to claim 1, wherein the optical fiber is drawn along the process pathway at a draw speed of at least 30 m/s.

9. The method according to claim 1, wherein the optical fiber is drawn along the process pathway at a draw speed of at least 50 m/s.

10. The method according to claim 1, further comprising curing the coating liquid coating the optical fiber.

11. The method according to claim 10, wherein the curing is accomplished with an LED source.

12. The method according to claim 1, wherein the separate transverse flow of the coating liquid is directed against a gyre, the gyre comprising the coating liquid in the coating chamber and surrounding the optical fiber in the coating chamber.

13. The method according to claim 12, wherein the separate transverse flow of the coating liquid supplied at the inlet has a temperature less than the average temperature of the coating liquid in the gyre.

14. The method according to claim 13, wherein the temperature of the coating liquid supplied at the inlet is less than the average temperature of the coating liquid in the gyre by at least 5° C.

15. The method according to claim 12, wherein a difference between a maximum temperature of the coating liquid in the gyre and a minimum temperature of the coating liquid in the gyre is less than 80° C.

16. The method according to claim 1, wherein an approximately equal amount of the separate transverse flow of the coating liquid is removed at the outlet as is supplied to the inlet.

17. The method according to claim 1, wherein the separate transverse flow of the coating liquid is introduced at the inlet or removed from the outlet at a rate greater than 0.1 cm$^3$/s.

18. The method according to claim 1, wherein the separate transverse flow of the coating liquid is introduced at the inlet or removed from the outlet at a rate greater than 0.5 cm$^3$/s.

19. The method according to claim 1, further comprising drawing the optical fiber through a second coating chamber, the second coating chamber comprising a second coating liquid.

20. The method according to claim 1, further comprising returning the coating liquid removed at the outlet to the coating chamber.

* * * * *